United States Patent [19]

Miller

[11] 4,321,169

[45] Mar. 23, 1982

[54] WATER BASED ALKYD RESIN COATING COMPOSITION CONTAINING A POLYISOCYANATE CROSSLINKING AGENT

[75] Inventor: Lester I. Miller, Troy, Mich.

[73] Assignee: E. I. Du Pont de Nemours and Company, Wilmington, Del.

[21] Appl. No.: 155,976

[22] Filed: Jun. 3, 1980

[51] Int. Cl.$^3$ .............................................. C08L 61/32
[52] U.S. Cl. .................................... 524/428; 428/334; 524/512; 524/311
[58] Field of Search ............... 260/22 TN, 22 CB, 21, 260/23 P, 29.2 E; 428/334, 339

[56] References Cited

U.S. PATENT DOCUMENTS

| | | | |
|---|---|---|---|
| 3,269,967 | 8/1966 | Broadhead | 260/22 R |
| 3,376,241 | 4/1968 | Que | 260/20 |
| 3,463,750 | 8/1969 | Ghosh | 260/22 R |
| 3,474,060 | 10/1969 | Dhein et al. | 260/21 |
| 3,527,721 | 9/1970 | Hönel et al. | 260/21 |
| 3,660,330 | 5/1972 | Dhein et al. | 260/22 TN |
| 3,748,293 | 7/1973 | Torelli | 260/21 |
| 3,761,433 | 9/1973 | High | 260/22 A |
| 3,789,037 | 1/1974 | Miller | 260/16 |
| 3,844,993 | 10/1974 | Miller | 260/22 TN |
| 3,894,978 | 7/1975 | Montesissa et al. | 260/22 CB |
| 3,980,602 | 9/1976 | Jakubauskas | 260/29.6 TA |
| 4,020,216 | 4/1977 | Miller | 260/22 TN |
| 4,056,495 | 11/1977 | Kawamura et al. | 260/22 CB |
| 4,081,411 | 3/1978 | Hunsucker | 260/22 CQ |
| 4,102,836 | 7/1978 | Johnson | 260/22 TN |
| 4,116,902 | 9/1978 | Harris et al. | 260/22 TN |
| 4,116,904 | 9/1978 | Verma | 260/22 R |
| 4,123,404 | 10/1978 | Lasher | 260/29.2 E |
| 4,132,686 | 1/1979 | Toyoshima et al. | 260/21 |
| 4,133,786 | 1/1979 | Harris et al. | 260/29.2 E |

FOREIGN PATENT DOCUMENTS

| | | | |
|---|---|---|---|
| 748475 | 4/1970 | Belgium . | |
| 803346 | 8/1973 | Belgium . | |
| 45-35434 | 11/1970 | Japan . | |
| 46-31342 | 9/1971 | Japan . | |
| 47-13183 | 4/1972 | Japan . | |
| 53-36853 | 10/1978 | Japan | 260/21 |
| 256140 | 4/1970 | U.S.S.R. . | |

*Primary Examiner*—Paul R. Michl

[57] ABSTRACT

A water based coating composition that can be dried at ambient temperatures and is useful for coating metal or plastic substrates and in particular for finishing or repairing automobiles and trucks; the coating composition contains watersoluble organic solvent, binder and pigments; the binder is of (1) an alkyd of an esterification product of drying oil fatty acids, aromatic polycarboxylic acids and a polyhydric alcohol;
(2) an alkylated melamine formaldehyde resin,
(3) an acrylic dispersing resin and
(4) an organo metallic drier;

the improvement that is used with this composition is (1) a polyisocyanate such as the biuret of hexamethylene diisocyanate or isophorone diisocyanate and (2) an aqueous ammonia solution.

14 Claims, No Drawings

WATER BASED ALKYD RESIN COATING COMPOSITION CONTAINING A POLYISOCYANATE CROSSLINKING AGENT

BACKGROUND OF THE INVENTION

This invention is directed to a coating composition and in particular to an aqueous coating composition containing an alkyd resin and a polyisocyanate crosslinking agent.

Automotive and truck manufacturers and the automotive and truck repair industry require coating compositions that form finishes that are weatherable, durable, and have an excellent appearance. In particular, the repair industry requires finishes that have excellent adhesion to all types of painted or primed substrates. Manufacturer and repair industry needs have been met by solvent based thermosetting coating compositions such as a coating composition of an alkyd resin and a polyisocyanate as shown by Miller U.S. Pat. No. 3,789,037 issued Jan. 29, 1974 or a solvent based composition of an ambient temperature curing acrylic resin and a polyisocyanate as shown by Miller U.S. Pat. No. 3,844,993 issued Oct. 29, 1974.

Air pollution regulations are becoming stricter in many states and in the future, solvent based coating composition may not be acceptable for use. Water based coating compositions can be used to meet air pollution regulations. Coating compositions containing polyisocyanates are well known crosslinking agents that provide durable finishes. However, to use a polyisocyanate in a water based coating composition, the polyisocyanate is reacted with a blocking agent to prevent isocyanate groups from reacting with water. To cure compositions containing blocked polyisocyanate, elevated temperatures are required to unblock the polyisocyanate. Increased energy costs make coating compositions that require baking, unattractive. Also, many manufacturers and repair shops do not have baking facilities.

The novel coating composition of this invention provides a finish that is acceptable to automotive and truck manufacturers and to the automotive and truck repair industry, meets current pollution regulations and does not require baking at elevated temperatures but cures at ambient temperatures to a durable, weatherable and glossy finish.

SUMMARY OF THE INVENTION

In a composition containing about 40-90% by weight of a film forming binder, and about 10-60% by weight of water soluble organic solvent; wherein the binder is of about (1) 60-90% by weight, based on the weight of the binder, of an alkyd resin which is the esterification product of drying oil fatty acids, aromatic polycarboxylic acids, and a polyhydric alcohol and has an acid number of about 20-100 and a weight average molecular weight of about 800-15,000 determined by gel permeation chromatography;

(2) 0.5-15% by weight, based on the weight of the binder, of an alkylated melamine formaldehyde resin;

(3) 1-20% by weight, based on the weight of the binder, of an acrylic dispersing resin;

(4) 0.5-5% by weight, based on the weight of the binder, of an organo metallic drier;
the improvement used in combination with the above composition comprises (1) about 2-25% by weight, based on the weight of the coating composition, of a polyisocyanate and (2) about 5-200% by weight, based on the weight of the coating composition, of an aqueous ammonia solution.

DETAILED DESCRIPTION OF THE INVENTION

The coating composition contains about 40-90% by weight of a film forming binder and usually about 70-85% by weight of the film forming binder. The remainder of the composition comprises water soluble organic solvent. To this coating composition, about 2 to 25% by weight, based on the weight of the coating composition, of a polyisocyanate is added.

After the polyisocyanate is added to the coating composition and thoroughly blended therewith, about 5-200% by weight, based on the weight of the coating composition, of an aqueous ammonia solution is added to lower the viscosity of the coating composition to a level at which the composition can readily be applied to a substrate. It is surprising and unexpected that the polyisocyanate remains reactive in the aqueous solution and will crosslink with the binder under ambient temperatures and form a durable finish with an acceptable appearance.

To apply the coating composition by spraying, a viscosity of about 16 to 50 seconds measured at 25° C. according to ASTM 1084-63 is required. To achieve this viscosity, it may be necessary to add an additional aqueous ammonia solution which may contain up to 20% by weight of water soluble solvent.

The aqueous ammonia solution contains about 0.1-10% by weight of ammonia and 90-99.9% by weight water. Preferably, the solution contains about 0.5-3% by weight ammonia and 97-99.5% by weight water. Water soluble solvents, described hereinafter, in amounts of 0.1-20% by weight can be added to the solution.

The resulting composition has a pH in the range of about 6.5-9. Usually, a pH of 7-8 is used. Sufficient ammonia is used to form a salt of the alkyd resin and the acrylic dispersing resin in order to disperse these resins in the coating composition.

Typical polyisocyanate that can be used are: ethylene diisocyanate, propylene-1,2-diisocyanate, tetramethylene diisocyanate, hexamethylene diisocyanate, decamethylene diisocyanate, cyclohexylene-1,2-diisocyanate, methylene-bis-(4-cyclohexylisocyanate), ethylene-bis-(4-cyclohexylisocyanate), propylene-bis-(4-cyclohexylisocyanate), isophorone diisocyanate, cyclic aliphatic trimer of hexamethylene diisocyanate, and the like.

The preferred polyisocyanate used in this invention has the formula:

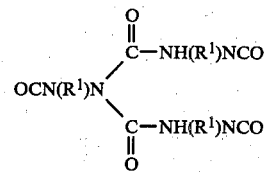

wherein $R^1$ is an alkyl group having 1-12 carbon atoms. One preferred polyisocyanate is the biuret of hexamethylene diisocyanate that has the above structural formula in which $R^1$ is a saturated straight chain hydrocarbon group having 6 carbon atoms. These biurets are prepared according to the process described in Mayer et al. U.S. Pat. No. 3,245,941, issued Apr. 12, 1966.

Typical water soluble solvents that can be used in the coating composition and the aqueous reducer solution are as follows: ethylene glycol monoethyl ether, ethylene glycol monobutyl ether, propylene glycol propyl ether, isopropanol, ethanol, methanol, butanol and other alcohols, acetone, and the like. Small amounts of nonwater soluble solvents such as toluene, xylene, acetates and mineral spirits can be used. The amount of solvent used to the composition with the aqueous reducer solution can be adjusted to meet and comply with governmental regulations.

The coating composition can be a clear but usually contains pigments in a pigment to binder weight ratio of about 1:100 to 300:100. Typical pigments that can be used are as follows: titanium dioxide, aluminum flake, red, yellow or orange iron oxide, "Irgazin" yellow and green, copper phthalocyanine green and blue, "Monastral" red, extender pigments and a wide variety of other organic and inorganic pigments.

The alkyd resin used in the composition is the esterification product of drying oil fatty acids, aromatic polycarboxylic acids and a polyhydric alcohol. To prepare the alkyd resin, the above constituents along with an esterification catalyst are charged into a reaction vessel. Either a conventional fusion or solution process using conventional equipment can be used to prepare the alkyd resin. Generally, reaction temperatures of about 200°–275° C. for 1 to 5 hours are used to prepare the resin. The resulting alkyd resin has an acid number of about 20–100 and a weight average molecular weight of about 800–15,000 and a number average molecular weight of about 400–4000 determined by gel permeation chromatography.

Typical solvents that can be used in the solution process for making the alkyd resin are water miscible or water soluble and are as follows: ethers, aliphatic alcohols such as methanol, ethanol, propanol, isopropanol, butanol, ethylene glycol monoalkyl ethers, such as ethylene glycol monobutyl ether, propylene glycol monopropyl ether, ethylene glycol monoalkyl ether acetates, and the like.

Typical esterification catalysts that are used in the process for preparing alkyd resins are as follows: barium oxide, barium hydroxide, barium naphthenate, calcium oxide, calcium hydroxide, calcium naphthenate, lead oxide, lithium hydroxide, lithium naphthenate, lithium ricinoleate, sodium hydroxide, sodium naphthenate, zinc oxide, and lead tallate.

Typical drying oil fatty acids that are used to prepare alkyd resin are as follows: dehydrated castor oil fatty acids, heat-bodied soya oil fatty acids, tung oil fatty acids, linseed oil fatty acids, oiticica oil fatty acids, safflower oil fatty acids, soya oil fatty acids, and the like. Soya oil fatty acids are preferred.

Typical aromatic polycarboxylic acids that can be used to prepare the alkyd resin are as follows: isophthalic acid, terephthalic acid, phthalic acid, trimellitic acid or its anhydride. A combination of isophthalic acid and trimellitic acid or its anhydride is preferred.

Typical polyhydric alcohols that can be used to prepare alkyd resins are as follows: ethylene glycol, propylene glycol, 1,3-butylene glycol, pentanediol, neopentyl glycol, hexylene glycol, diethylene glycol, dipropylene glycol, triethylene glycol, glycerol, trimethylolethane, trimethylolpropane, pentaerythritol, methylglucoside, dipentaerythritol, and sorbitol. Trimethylol propane is preferred.

Monobasic organic acids also can be used to prepare alkyd resins and are as follows: abietic acid, benzoic acid, p-tert-butylbenzoic acid, caproic acid, caprylic acid, crotonic acid, 2-ethylhexoic acid, lauric acid, pelargonic acid, rosin acids, and the like.

Monofunctional alcohols also can be used to prepare alkyd resins and are as follows: butanol, pentanol, hexanol, isooctanol, ethoxyethanol, and butyl carbitol.

Drying oils also can be used to prepare the alkyd resin such as castor oil, heat bodied soya oil, soya oil, corn oil, dehydrated castor oil, linseed oil, oiticica oil, safflower oil and tung oil.

One particularly preferred alkyd resin that forms a high quality composition is the esterification product of soya oil fatty acids/isophthalic acid/trimellitic acid or its anhydride/trimethylol propane that has an acid number of about 20–100 and preferably 35–45 and a weight average molecular weight of about 2,000–12,000.

The alkylated melamine formaldehyde resin used in the composition can contain 1–4 carbon atoms in the alkyl group and is water soluble or water dispersible. One preferred resin that forms a high quality product is a partially methylated melamine formaldehyde resin that has an equivalent weight of about 225–325. By equivalent weight is meant, the grams of alkylated melamine formaldehyde resin required to react with one gram mole of carboxyl, hydroxyl or amide groups of a polymer.

The acrylic dispersing resin used in the composition contains sufficient carboxyl groups to disperse resin and pigments.

Useful types of resin are disclosed in Jakubauskas U.S. Pat. No. 3,980,602 issued Sept. 14, 1976. One preferred resin that forms a high quality product is a polymer of methyl methacrylate/styrene/butyl acrylate/acrylic acid. The following ratio of constituent is particularly preferred 25/30/35/10.

The composition contains organo metallic driers. Typical driers are cobalt naphthenate, managanese naphthenate, nickel naphthenate, nickel octoate, zirconium octate, lead tallate and the like.

One preferred combination of driers comprises zirconium octoate, cobalt naphthenate and 1,10 phenanthroline.

One particularly useful coating composition of this invention comprises about 15–30% by weight of water soluble solvents and 70–85% by weight of a film forming binder. The binder is of about 80–85% by weight of the alkyd resin of soya oil fatty acids, isophthalic acid/trimellitic acid or its anhydride/and trimethylol propane having an acid number of 35–45 and a weight average molecular weight, determined as above, of 8,000–12,000; 1–4% by weight of a partially methylated melamine formaldehyde resin having an equivalent weight of about 225–325, 13–17% by weight of an acrylic dispersing resin of styrene/methyl methacrylate/butyl acrylate/acrylic acid; and 1–3% by weight of an organo metallic drier of zirconium octoate, cobalt naphthenate and phenanthroline.

As aforementioned, the composition is pigmented for most uses. The pigments are formed into a mill base by grinding the pigment with the alkyd resin or acrylic dispersing resin and the resulting mill base is added to form a pigmented composition. The mill base is prepared by conventional grinding techniques such as sand grinding, ball milling, attritor grinding and the like.

After the addition of the polyisocyanate solution and the aqueous ammonia solution further reduction to an application viscosity with an aqueous ammonia solution may be necessary. The resulting composition can be applied to a variety of substrates by any of the conventional application methods such as spraying, electrostatic spraying, dipping, brushing, flow coating, roller coating and the like. The resulting coatings can be dried at ambient temperatures or baked at relatively low temperatures up to about 140° C. for about 5 minutes to 2 hours. The resulting coating is about 0.1–5 mils thick and is glossy, durable, weatherable, and has excellent appearance.

It may be desireable to use a spray gun with two feed streams to apply the composition. One feed stream would contain a mixture of the coating composition and the aqueous ammonia solution and the second feed stream would contain the polyisocyanate solution and mixing would occur in the gun before the resulting composition is sprayed onto a substrate.

The coating composition has excellent adhesion to all types of substrates such as wood, glass, bare metal, metal painted with the following: acrylic enamel, acrylic lacquer, acrylic dispersion enamel, acrylic dispersion lacquer, alkyd enamel, conventional alkyd or epoxy primers; fiberglass reinforced with polyester painted as above; acrylonitrile/butadiene/styrene plastics or other plastics painted as above. The aforementioned characteristics make the composition particularly useful as a finish or a refinish used for automobiles and truck bodies.

The following example illustrates the invention. All quantities are on a weight basis unless otherwise indicated.

EXAMPLE 1

The following pigment dispersions are prepared:

| White Pigment Dispersion | Parts By Weight |
|---|---|
| Alkyd Resin Solution (80% by weight solids alkyd resin of soya oil fatty acids/isophthalic acid/trimellitic acid/trimethylol propane having an acid No. of about 40 and a weight average molecular weight of about 11,000 determined by gel permeation chromatography) | 16.57 |
| Ethylene glycol monoethyl ether | 17.77 |
| Titanium dioxide pigment | 65.66 |
| Total | 100.00 |

The above constituents are blended together and charged into a conventional sand mill and ground to a 0.5 mil fineness.

The following tinting is prepared:

| White Tinting | Parts By Weight |
|---|---|
| White Pigment Dispersion (prepared above) | 41.82 |
| Alkyd Resin Solution (described above) | 41.62 |
| Methylated Melamine Formaldehyde Resin Solution (80% weight solids of a partially methylated melamine formaldehyde resin having an equivalent weight of 225–325 in a 1:1 isopropanol/isobutanol solvent) | 1.78 |
| Acrylic Resin Solution (76% solids in isopropanol of an acrylic polymer of 25% methyl methacrylate, 30% styrene, 35% butyl acrylate and 10% acrylic acid) | 9.23 |
| Toluene | 0.58 |
| Ethylene glycol monobutyl ether | 4.73 |
| Methyl ethyl ketoxime | 0.24 |
| Total | 100.00 |

The above constituents are thoroughly mixed together to form a tinting that has a pigment to binder weight ratio of about 57.97/100 and a volume solid content of 63.8%.

A drier composition is prepared by blending together the following:

| | Parts By Weight |
|---|---|
| Zirconium Octoate Solution containing 6% by weight zirconium in minerial spirits | 37.79 |
| "Cobalt Hydrocure" Solution (55% solids cobalt napththenate in mineral spirits) | 56.60 |
| 1,10 phenanthroline | 5.61 |
| Total | 100.00 |

A thinner composition is prepared by blending together the following:

| | Parts By Weight |
|---|---|
| Ammonia Solution (29% aqueous solution) | 2.15 |
| Deionized water | 97.85 |
| Total | 100.00 |

Paint A is formulated by blending together the following constituents:

| | Parts by Weight |
|---|---|
| Portion 1 | |
| White Tinting (prepared above) | 100.00 |
| Drier Composition (prepared above) | 2.5 |
| Polyisocyanate solution (75% solids solution of the biuret of hexamethylene diisocyanate in 50:50 xylene/ethylene glycol mono ethyl ether acetate) | 12.5 |
| Portion 2 | |
| Thinner composition (prepared above) | 140.00 |
| Total | 255.00 |

Portion 1 is thoroughly blended and then portion 2 is added and the constituents are blended together. The resulting paint is filtered through a 100 mesh sieve.

A control paint is formulated that is identical to the above paint but the polyisocyanate solution is omitted.

Paint A and the control paint are each sprayed onto separate alkyd resin primed phosphated steel substrates and dried at an ambient temperature to form a paint film about 1.9–2.0 mils thick. The following tests are conducted on the paint films:

| Hardness (values in knoops) | | | |
|---|---|---|---|
| | 1 day | 2 days | 7 days |
| Paint A | 0.95 | 1.24 | 3.2 |
| Control | 0.6 | 0.89 | 2.0 |

Resistance to toluene after 24 hours: Control—poor, Paint A—Good
Tape Print resistance after 24 hours:
Control—6
Paint A—10
(Scale 1–10 in which 10 shows no printing from tape)
20° Gloss-Exposure 6 months weathering in Florida
Control—14
Paint A—46

EXAMPLE 2

A silver mill base is prepared as follows:

| | Parts By Weight |
|---|---|
| Alkyd Resin Solution (described in Example 1) | 67.57 |
| Aluminum Paste (16.19 parts of aluminum flake in 24.91 parts mineral spirits) | 24.91 |
| Ethylene glycol monoethyl ether | 7.52 |
| Total | 100.00 |

The above constituents are thoroughly blended together to form a mill base.

A thinner solution is prepared by blending together the following constituents:

| | Parts By Weight |
|---|---|
| Acetone | 17.11 |
| Diethylene glycol monobutyl ether | 3.38 |
| Deionized Water | 77.34 |
| Ammonia solution (29% aqueous solution) | 2.17 |
| Total | 100.00 |

A silver paint is prepared by blending together the following constituents:

| | Parts By Weight |
|---|---|
| Portion 1 | |
| Silver Mill Base (prepared above) | 22.00 |
| Acrylic Resin Solution (described in Example 1) | 12.42 |
| Methyl ethyl ketoxime | 0.32 |
| Ethylene glycol monoethyl ether | 1.86 |
| Alkyd Resin Solution (described in Example 1) | 50.47 |
| Methylated Melamine Formaldehyde Resin Solution (described in Example 1) | 2.39 |
| Ethylene glycol monobutyl ether | 6.07 |
| Toluene | 1.09 |
| Drier Composition (prepared in Example 1) | 3.60 |
| Catalyst solution (0.27% of dibutyltin dilaurate in pentane dione) | 2.00 |
| Portion 2 | |
| Polyisocyanate solution (described in Example 1) | 12.00 |
| Portion 3 | |
| Thinner Composition (prepared in Example 1) | 150.00 |
| Total | 262.22 |

Portion 1 is thoroughly mixed together, then portion 2 is added and mixed, then portion 3 is added and mixed to form Paint B. A control paint is prepared using the same constituents as above except the catalyst solution and polyisocyanate solution are omitted. Paint B and control paint are each sprayed onto separate alkyd resin primed phosphated steel panels and dried at an ambient temperature. The paint film on each panel is about 1.9–2.0 mils thick.

The paint B panel has an initial yellow color but after about 24 hours the color matched the control. Tape resistance after 48 hours is significantly better for Paint B in comparison to the control. Initially gloss measured at 20° is 83 for Paint B and 82 for the control. After 2.8 months exposure in Florida Paint B has a 20° gloss of 37 and the control has a 20° gloss of 25.

EXAMPLE 3

Paint C is prepared that is identical to Paint B of Example 2 except the following polyisocyanate solution is used for the polyisocyanate solution used in Example 2: 70% solid solution of isophorone diisocyanate in a 2/1 blend xylene/ethylene glycol monoethylether.

The resulting Paint C is applied to an alkyd resin primed phosphatized steel substrate and dried as in Example 2. The properties of this resulting Paint C film are very similar to Paint B.

EXAMPLE 4

Paint D is prepared by blending together the following constituents and then filtering the resulting paint through a 100 mesh sieve:

| | Parts By Weight |
|---|---|
| Portion 1 | |
| White Tinting (prepared in Example 1) | 100.0 |
| Drier Composition (prepared in Example 1) | 2.9 |
| Hexamethoxymethyl melamine solution (80% solids in a 1/1 blend isopropanol/isobutanol) | 10.9 |
| Portion 2 | |
| Polyisocyanate solution (described in Example 1) | 10.0 |
| Portion 3 | |
| Thinner Composition (prepared in Example 1) | 150.00 |
| Total | 272.9 |

A control paint is prepared using the same constituents except the polyisocyanate solution is omitted. Paint D and the control paint are each sprayed onto separate alkyd resin primed phosphatized steel panels and dried at ambient temperatures for 24 hours to provide a paint film on each panel about 1.9–2.0 mils in thickness.

The paint films are tested as follows:

|  | Paint D | Control |
|---|---|---|
| Tape Print | 8.5 | 5 |
| Water Spot Resistance | 7 | 6 |
| Toluene Resistance | 6 | 2 |
| Gasoline Resistance | 8 | 4.5 |
| Hardness (knoops) | 2.7 | 0.6 |

| Gloss measured at 20° | Initial | 3-month Florida Exposure | Initial | 3-month Florida Exposure |
|---|---|---|---|---|
|  | 86 | 60 | 86 | 56 |

Tape print, water spot resistance, toluene and gasoline resistance are measured on a scale of 1–10 where 10 is perfect.

EXAMPLE 5

Paint E is prepared by blending together the constituents and then filtering the resulting paint through a 100 mesh sieve:

|  | Parts By Weight |
|---|---|
| Portion 1 |  |
| White Tinting (prepared in Example 1) | 100.0 |
| Drier Composition (prepared in Example 1) | 2.5 |
| Portion 2 |  |
| Pentane dione | 2.0 |
| Polyisocyanate solution (43% solids of the biuret of hexamethylene diisocyanate in ethyl acetate) | 15.0 |
| Portion 3 |  |
| Thinner Composition (prepared in in Example 1) | 130.0 |
| Total | 249.5 |

A control paint identical to the above paint is prepared except the pentane dione and polyisocyanate solution are omitted. Paint E and the control paint are sprayed onto separate alkyd resin primed steel panels and dried at ambient temperatures for 24 hours to provide a paint film on each panel about 1.9–2.0 mils thick. Hardness for paint E is 2.2 knoops at 4 days and 3.3 at 2 weeks compared to the control which is 1.3 after 4 days and 1.9 after 2 weeks. The color of paint E is yellower than the control from 1–12 hours after spraying but yellow color disappears after about 36 hours.

| Gloss measured at 20° | Initial | 3-months Florida Exposure | 6-months Florida Exposure |
|---|---|---|---|
| Control | 86 | 42 | 14 |
| Paint E | 85 | 53 | 28 |

I claim:

1. In a coating composition comprising of about 40–90% by weight of a film forming binder and about 10–60% by weight of water soluble organic solvent; wherein the binder consists essentially of about
   (1) 60–90% by weight, based on the weight of the binder, of an alkyd resin comprising the esterification product of drying oil fatty acids, aromatic polycarboxylic acids and a polyhydric alcohol and having an acid number of about 20–100 and a weight average molecular weight of about 800–15,000 determined by gel permeation chromatography;
   (2) 0.5–15% by weight, based on the weight of the binder, of an alkylated melamine formaldehyde resin;
   (3) 1–20% by weight, based on the weight of the binder, of an acrylic dispersing resin containing carboxyl groups and
   (4) 0.5–5% by weight, based on the weight of the binder, of an organo metallic drier comprising zirconium octoate, cobalt naphthenate and phenanthroline;
the improvement used in combination therewith comprises
   (1) about 2–25% by weight, based on the weight of the coating composition, of a polyisocyanate and
   (2) about 5–200% by weight, based on the weight of the coating composition, of an aqueous ammonia solution comprising about 0.1–10% by weight ammonia and 90–99% by weight water.

2. The coating composition of claim 1 containing sufficient amount of aqueous ammonia solution to provide an application viscosity of about 16 to 50 seconds measured according to ASTM 1084-63 and to provide a pH of about 6.5–9.0.

3. The coating composition of claim 1 containing pigment in a pigment to binder ratio of about 1:100 to 300:100.

4. The coating composition of claim 1 in which the polyisocyanate is of the formula

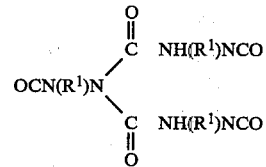

wherein $R^1$ is a divalent aliphatic hydrocarbon radical having 1–12 carbon atoms.

5. The coating composition of claim 4 in which the polyisocyanate is the biuret of hexamethylene diisocyanate.

6. The coating composition of claim 1 in which the polyisocyanate is isophorone diisocyanate.

7. The coating composition of claim 1 in which the polyisocyanate is a cyclic aliphatic trimer of hexamethylene diisocyanate.

8. The coating composition of claim 1 in which the alkyd resin consists essentially of the esterification product of soya oil fatty acids, trimellitic acid or its anhydride, isophthalic acid and trimethylol propane.

9. The coating composition of claim 8 in which the alkyd resin has an acid number of about 35–45 and a weight average molecular weight of about 8,000–12,000.

10. The coating composition of claim 8 in which the alkylated melamine formaldehyde resin is a partially methylated melamine formaldehyde resin.

11. The coating composition of claim 8 in which the acrylic dispersing resin consists of styrene/methyl methacrylate/butyl acrylate/acrylic acid.

12. The coating composition of claim 8 in which the organo metallic drier consists essentially of zirconium octoate, cobalt naphthenate and phenanthroline.

13. The coating composition of claim 1 which comprises about 15–30% by weight of water soluble solvents and 70–85% by weight of a film forming binder; wherein the binder consists essentially of (1) 80–85% by weight, based on the weight of the binder, of an alkyd resin having an acid number of about 35–45 and a weight average molecular weight of about 8,000–12,000.

(2) 1–4% by weight, based on the weight of the binder, of a partially methylated melamine formaldehyde resin having an equivalent weight of about 225–325, (3) 13–17% by weight, based on the weight of the binder, of an acrylic dispersing resin consisting of styrene/methyl methacrylate/butyl acrylate/acrylic acid, (4) 1–3% by weight, based on the weight of the binder, of an organo metallic drier consisting essentially of zirconium octoate, cobalt naphthenate and phenanthroline.

14. A metal substrate coated with about 0.1–5 mil thick layer of the dried coalesced composition of claim 1.

* * * * *